United States Patent [19]
Mercer

[11] Patent Number: 5,563,952
[45] Date of Patent: Oct. 8, 1996

[54] AUTOMATIC DYNAMIC VOX CIRCUIT

[75] Inventor: Walter J. Mercer, Bedford, Tex.

[73] Assignee: Tandy Corporation, Fort Worth, Tex.

[21] Appl. No.: 197,152

[22] Filed: Feb. 16, 1994

[51] Int. Cl.$^6$ ................................................ H04R 29/00
[52] U.S. Cl. ............................................ 381/56; 381/110
[58] Field of Search ...................................... 381/56, 110

[56] References Cited

U.S. PATENT DOCUMENTS

| | | |
|---|---|---|
| 4,052,568 | 10/1977 | Jankowski . |
| 4,542,525 | 9/1985 | Hopf ........................................ 381/56 |
| 4,625,083 | 11/1986 | Poikela .................................... 379/389 |

*Primary Examiner*—Forester W. Isen

*Attorney, Agent, or Firm*—William A. Linnell; Stephen S. Mosher

[57] ABSTRACT

A voice detection circuit uses normal and customary signal peaks and pauses in speech to distinguish voice from mere noise. The voice detection circuit includes an audio input device for receiving an audio signal and comparing it to a threshold, and a detector for generating the VOX output signal responsive to the presence of the peaks and pauses in the audio signal which rise above the threshold. The switch is actuated upon the VOX output signal indicating that the audio signal includes selected patterns of peaks and pauses and thus comprises voice signals. Illustratively, the threshold may be varied in accordance with the input signals when the voice detection circuit indicates that the input audio signals do not comprise voice signals.

22 Claims, 3 Drawing Sheets

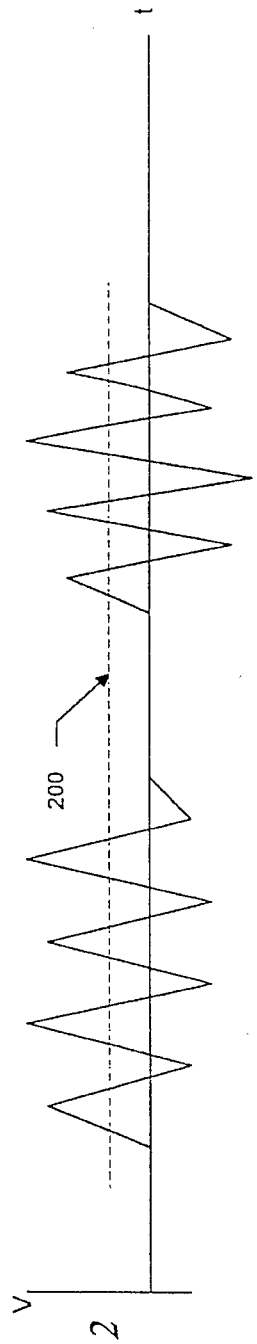
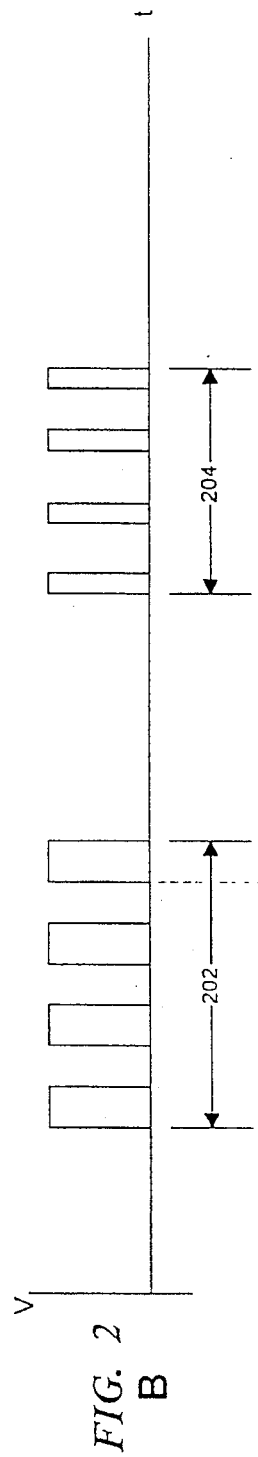
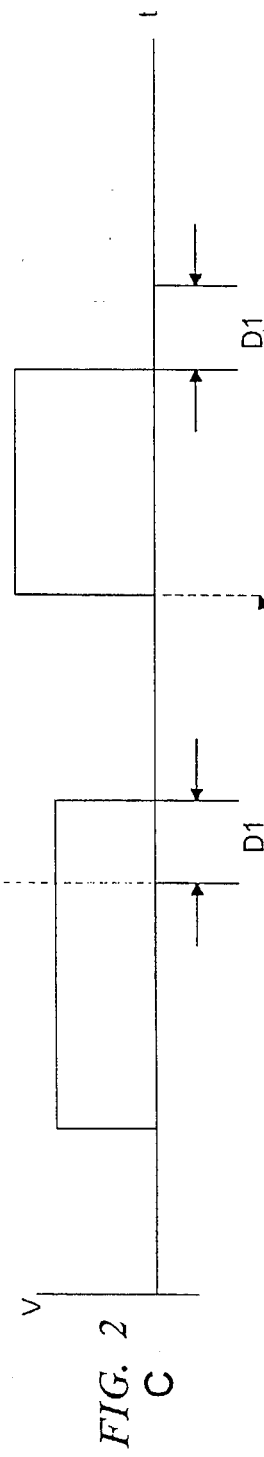
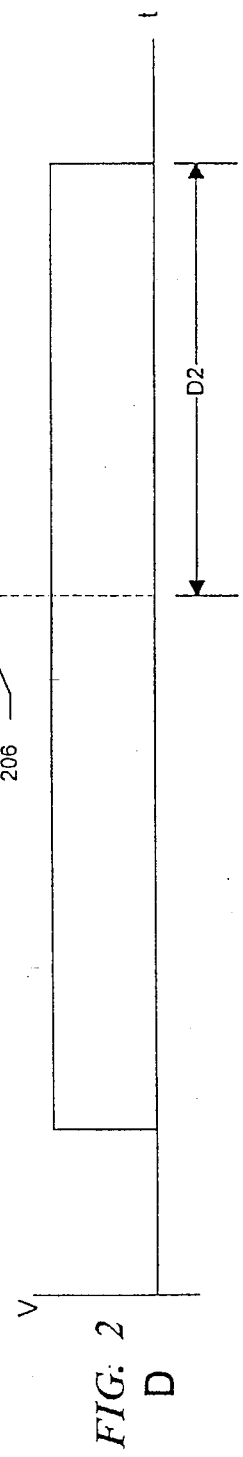
FIG. 2A
FIG. 2B
FIG. 2C
FIG. 2D

AUTOMATIC DYNAMIC VOX CIRCUIT

FIELD OF THE INVENTION

This invention relates generally to voice detection circuits for use in voice-operated control of electronic systems. The invention finds particular utility in voice-actuated communication systems such as intercom systems.

BACKGROUND OF THE INVENTION

In a conventional electronic voice communication system, each user typically communicates by means of an audio input device, e.g., a microphone that may be held close to the user's mouth or mounted on a wall or console, and an audio output device, e.g., a speaker mounted in a handset, a headset worn by the user or mounted on a wall or console nearby. Such communication systems typically include telephone, speakerphone, intercom, mobile radio systems and many specialized communication systems such as aircraft communication systems which generally include both an intercom for communication within the aircraft, e.g., between a pilot and co-pilot, and a radio-frequency transceiver ("radio") for external communication, e.g., with an airport tower.

Such communication systems must often deal with notoriously noisy and busy environments, where any received messages can be difficult to comprehend because of ambient environmental noise, and where users often do not have their hands free to operate, e.g., squelch controls on the systems to reduce the background noise.

One prior art arrangement for reducing background noise involves the use of voice-activated control circuits for hands-free control of the communication system. Thus, if no one speaks, the microphone does not transmit; if someone speaks, however, the microphone is turned "on" automatically, and the system "listeners" can hear the spoken words. Known versions of such voice-activated circuits find application in many types of commercial products, such as baby-minders and tape-recorders.

Voice activated control circuits typically incorporate voice detection circuits (sometimes called "voice detectors") and voice-operated switches ("VOS") that control communication in response to control signals from the detectors. On detection of the presence of a human voice, the VOS is activated so as to turn "on" the product.

The voice detector must distinguish voice from other sounds, i.e., noise, in order to prevent needless and undesirable VOS activation. Conventionally, voice is distinguished from noise by identifying sudden increases in audio magnitude that would indicate the commencement of speech.

Typically, such a voice detector has an adjustment for setting a particular noise amplitude threshold, below which any detected audio signal will not activate the VOS, and above which any detected audio signal will activate the VOS. The threshold adjustment is sometimes factory-set, but can often be set by a user during operation of the system, e.g., by setting an externally-accessible control pot.

Unfortunately, a fixed, factory-set noise amplitude threshold can significantly compromise the operation of the detector. If the threshold is set too low, ambient noise levels can activate the VOS (i.e., "false-positive" activation), thereby causing the system to transmit mere noise. On the other hand, if the threshold is set too high, the VOS may not activate during some genuine voice transmissions (i.e., "false-negative" activation).

User-adjustment of the noise threshold, when provided, causes still other problems. More particularly, operation of the system can require that the user adjust the threshold at inconvenient times. For example, in voice-activated aircraft intercoms, threshold-adjustment can require the pilot to change the intercom settings during take-offs and landings. Moreover, since noise levels change frequently in many environments, the user often must re-adjust the threshold frequently. Such activities may be more than inconvenient; they can be serious distractions and annoyances for all concerned.

SUMMARY OF THE INVENTION

The invention resides in a voice detection ("VOX") circuit that uses normal and customary pauses in speech to discriminate voice from mere noise. By doing so, the invention is able to automatically adjust its own noise threshold, thereby avoiding the need for factory or user setting of noise thresholds and the drawbacks attendant with those threshold settings.

In its broader aspects, the invention comprises a voice detection circuit which generates a VOX output signal for controlling the actuation of a switch in a voice-activated apparatus. The voice detection circuit includes an audio input device for receiving an audio signal, a peak detect/ sample and hold (PDSH) circuit for adjusting the threshold level and a circuit for detecting the presence of characteristic pauses in the audio signal which indicate that the audio signal comprises a voice signal. The detecting circuit generates the VOX output signal responsive to the detected pauses. This enables the PDSH circuit to "hold" the threshold level during voice signals. Thus, the switch is actuated when the VOX output signal indicates that the audio signal comprises voice signals.

Preferably, the VOX output signal indicates that the audio signal comprises voice signals when the audio signal comprises (1) signal bursts, each comprising a plurality of signal peaks, each peak having a time duration less than or equal to a first predetermined time duration, and (2) pauses between the signal bursts that are at least equal to a first predetermined time duration and less than or equal to a second predetermined time duration. For example, the first predetermined time duration may be about 40 milliseconds, and the second predetermined time duration may be about one second.

More specifically, the invention comprises a voice detection circuit having a timing circuit for producing the VOX output signal. The invention also comprises a peak detector and sample and hold (PDSH) circuit for producing a threshold signal that (i) tracks peak values of the audio signal in response to a first VOX output signal value indicating that the audio signal does not comprise voice, and (ii) remains substantially constant in response to a second VOX output signal indicating the audio signal comprises voice.

A comparator produces an output signal having a selected change of state when the magnitude of an attenuated version of the audio signal becomes larger than the magnitude of the threshold signal. The timing circuit is responsive to the selected change of state in the comparator output signal for causing the VOX output signal to indicate a voice signal when the selected change of state indicates that the required peaks and pauses are present within the first and second predetermined time intervals.

The VOX circuit in accordance with the invention can be simple and economic in design and implementation, and reliable during use. A communication system incorporating the invention can provide voice-activated control of an intercom with significantly reduced false-negative and false-positive activation, even in noisy environments, thereby optimizing intercom communication quality. The inventive approach is significantly less expensive than speech recognition systems, which typically employ sophisticated techniques to actually comprehend the contents and meaning of the spoken word.

BRIEF DESCRIPTION OF THE DRAWINGS

The invention and its particular features and advantages can be better understood by referring to the following detailed description, when read together with the accompanying drawings, in which:

FIG. 2 shows waveform diagrams for selected components of FIG. 1; and

DETAILED DESCRIPTION OF A PREFERRED EMBODIMENT

Figure 1:
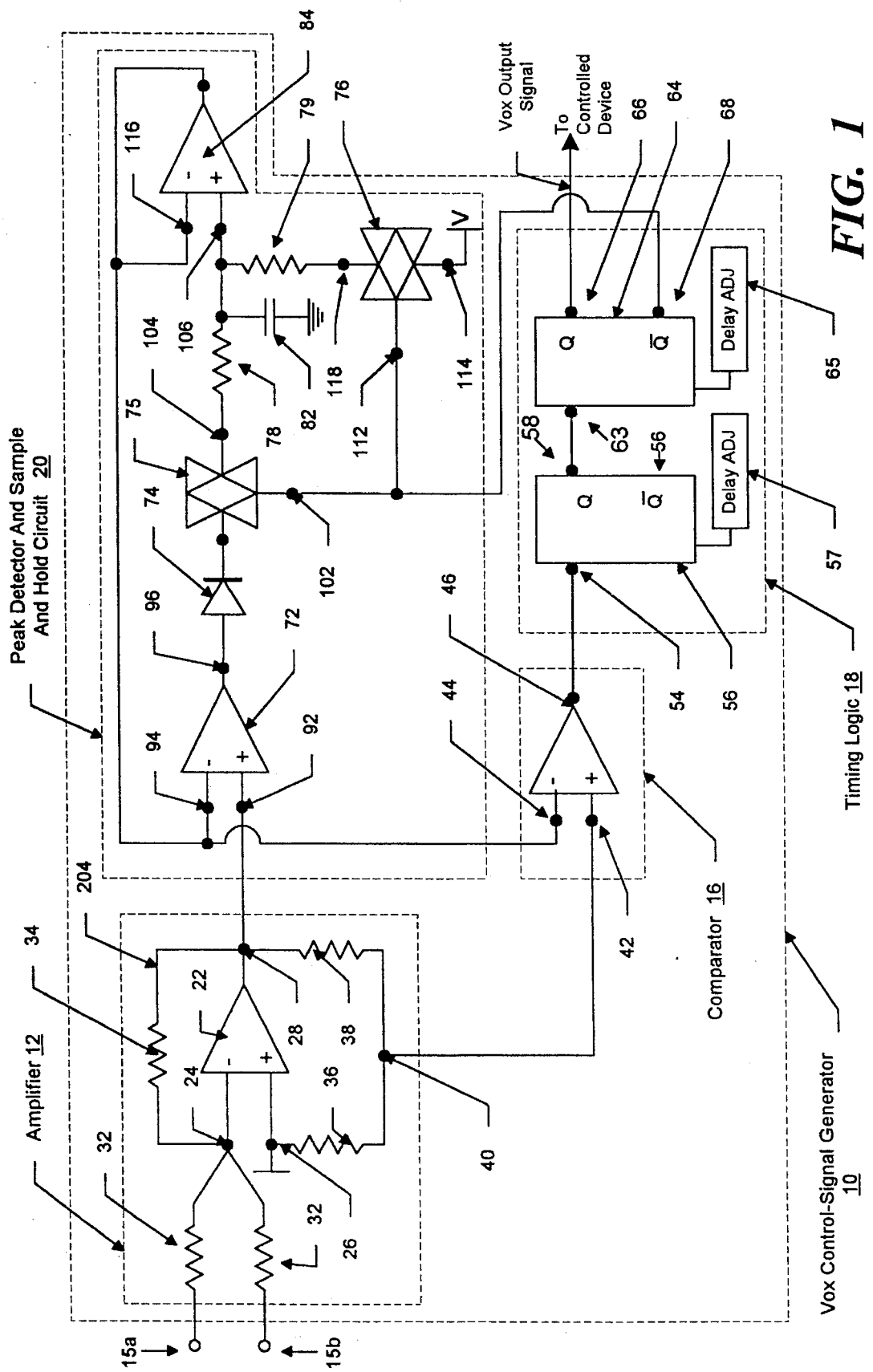
FIG. 1 is a schematic view, partially in block diagram form, of a VOX circuit in accordance with the invention.

FIG. 1 shows a VOX circuit 10 constructed in accordance with the principles of the invention for producing a VOX output signal indicative of whether a received audio signal comprises voice signals or mere noise. The main components of the VOX circuit 10 include an input summing amplifier 12 with attenuator (resistors 36 and 38), a comparator 16, timing logic 18, and a combined, peak detector and sample & hold ("PDSH") circuit 20.

Illustratively, the inventive VOX circuit can operate with several different input audio signal sources. Signals from these sources are applied to the VOX circuit 10 by means of terminals 15a and 15b. The input amplifier 12 combines audio signals received over separate terminals 15a and 15b into a single audio signal for processing in the rest of the VOX circuit 10.

More specifically, the amplifier 12 comprises an operational amplifier ("op amp") 22 with an inverting input terminal 24 connected, via first and second input resistors 32, to audio channels at terminals 15a, 15b for receiving respective first and second audio signals. A feedback resistor 34 is coupled between the inverting input terminal 24 and the output terminal 28 and the amplifier 12 has also a non-inverting input terminal 26 connected to a substantially constant DC voltage (V). In accordance with conventional feedback amplifier design, amplifier 12 sums the input signals on terminals 15a and 15b, inverts the sum, amplifies the sum signal by the gain of the amplifier and applies the amplified sum as an output signal on output terminal 28. In the illustrative embodiment shown in FIG. 1, the values of the input resistors 32 and the feedback resistor 34 are selected to produce an amplifier gain of one.

The output signal on output terminal 28 of amplifier 12 is attenuated by the voltage divider comprising resistors 36, 38 coupled respectively between the voltage source V and the output terminal 28 of amplifier 12. The value of divider resistors 36, 38 are selected to reduce the amplifier output signal at node 40 by, e.g., 6 dB. This attenuated output is provided to comparator 16 for processing as described in detail below.

For applications having a single audio input channel, the summing amplifier 12 can be omitted, with the exception of a suitable attenuating resistor, as will be apparent to those skilled in the art.

The output 28 of the summing amplifier 12 is also applied to a peak detector and sample-and-hold (PDSH) circuit 20. The peak detector portion of circuit 20 includes op amp 72, diode 74, resistor 78 and capacitor 82 (resistor 78 and capacitor 82 are "shared" with the sample-and-hold circuit) and the sample-and-hold portion includes first and second analog gates operating as solid state switches 76, resistors 78 and 79, a hold capacitor 72, and another op amp 84.

More particularly, the op amp 72 has a non-inverting input terminal 92 coupled to the output terminal 28 of op amp 22 for receiving the summed input signal, and an inverting input terminal 94 which receives the previously-sampled signal produced at the PDSH output as will be hereinafter described. Accordingly, op amp 72 acts as a comparator and produces a signal at output 96 that will be "high" or "low" depending on the relative values of the input signal at input terminal 92 and the present value of the threshold signal applied to input 94.

The comparator output at terminal 96 is applied to diode 74 with the amplifier 72, diode 74, resistor 78 and capacitor 82 acting as a peak detector as described below. The peak signal is, in turn, applied to a sample-and-hold circuit comprising switches 75 and 76, resistor 78, capacitor 82 and amplifier 84. More specifically, the peak signal is applied to input terminal 98 of switch 75. A control terminal of switch 75 receives the inverted version of the VOX output signal via output terminal 68 of one-shot multivibrator 64. As discussed below, switch 75 is enabled when no voice signals are detected and enables the peak detector to "follow" the input signal and dynamically establish a noise threshold for use in the voice signal detection circuitry.

An output terminal 104 of switch 75 is connected to a sampling circuit comprising resistor 78 and capacitor 82. In addition, the sampling circuit 78, 82 is connected to an input terminal 108 of second switch 76 which is also connected to voltage supply V. Switch 76 is also enabled by the VOX output signal and provides a discharge path for capacitor 82 in the sampling mode. When switches 75 and 76 are opened, they disconnect the capacitor 82 from the peak detector circuit and allow it to act as a "holding" capacitor so that the circuit effectively functions as a sample-and-hold circuit.

The sampled signal across capacitor 82 is provided to a non-inverting input terminal 106 of op amp 84 which is connected in a conventional voltage-follower arrangement. In the "hold" mode of the circuit switches 75 and 76 are disabled and capacitor 82 is isolated. The sampled voltage is then held on capacitor 82. Since amplifier 84 is connected as a voltage follower, the input 106 of amplifier 84 thereby presents a high impedance to capacitor 82 to prevent capacitor 82 from discharging in the "hold" mode of the circuit.

In the sampling mode, the peak-detected voltage at the output 118 of voltage follower 84 is provided to comparator 16 to use as a threshold for detecting audio signals. The comparator 16 produces an output signal when the attenuated input from amplifier 12 exceeds the threshold voltage generated by the PDSH circuit 20. To that end, the comparator 16 has an inverting input terminal 42 coupled to the node 40 to receive the attenuated input signal, and a non-inverting input terminal 44 coupled to receive the output of the PDSH circuit 20.

The comparator 16 provides an output via an output terminal 46 to the timing logic 18. The comparator output on output terminal 46 is HIGH whenever the attenuated audio input value exceeds the dynamic threshold from the PDSH circuit 20, indicating that the input is possibly voice signals.

The final differentiation between voice and noise signals is made by timing logic 18 which essentially detects the time duration of pauses in the audio signal that would be indicative of voice, and produces an output signal that serves as the VOX output signal.

The timing logic 18 has two cascaded circuit components, each comprising a monostable multivibrator ("one-shot") 56, 64. Each one-shot is arranged to be triggered by a positive edge (LOW-to-HIGH transition) of an applied signal. Consequently, the one-shot 56 triggers on a positive edge and its output terminal 58 rises to a HIGH value whenever the comparator output has a positive edge. In accordance with normal one-shot operation, the output 58 of one-shot 56 would normally return to a LOW value, or "timeout", within a predetermined timeout time period as determined by delay adjustment circuit 57 (normally an RC time constant circuit). However, one-shot 56 may also be "retriggered" by the positive edge of an additional pulse applied to the input during the timeout time period. In the case of a retrigger, the output of one-shot 56 remains HIGH for the predetermined timeout time period following the positive edge. Retriggering may occur multiple times to extend the output pulse length.

The output of the first one-shot 56 is provided to a second one-shot 64 which also triggers on a positive edge. The output of the second one-shot 64 is applied via an output terminal 66 to a voice-activated or controlled device (not shown) as the VOX output signal. An inverted version of the VOX output is applied via an output terminal 68 to the PDSH circuit 20 to control the sample and hold circuit as described below.

VOX Circuit Operation.

The operation of the VOX circuit 10 of FIG. 1 will now be described with additional reference to the waveform diagrams of FIG. 2.

The output of input amplifier 12 is illustrated by the waveform on line A of FIG. 2, which is exemplary of an audio signal containing voice signals. As can be seen, waveform A is a sinusoidal signal of varying amplitude and frequency, as is typical of audio signals. However, the sinusoidal signals occur in bursts separated by periods of silence or pauses, which is a typical pattern of voice signals.

The PDSH circuit 20 samples the output of amplifier 12 in order to generate a threshold level. During time periods of the input signal where no voice signals are detected, the threshold is allowed to dynamically change, therefore, the circuit will adjust to an increase in ambient noise. More particularly, when no voice signals are detected as described below, both switches 75 and 76 are closed. As previously mentioned, op amp 72 and diode 74 operate as a peak detector. If the output of amplifier 12 has a greater magnitude than the output of the sample-and-hold circuit 20, the positive difference at the output of op amp 72 charges capacitor 82 through diode 74 and resistor 78.

Alternatively, if the output of amplifier 12 is less than the output of the sample-and-hold circuit 20, the negative difference at the output of op amp 72 is blocked by diode 74. Thus, only the positive peaks of the signal charge capacitor 82.

However, since switch 76 is closed, capacitor 82 discharges through resistor 79 to voltage source V. Resistor 79 is chosen to have a relatively large value when compared to resistor 78 so that capacitor 82 charges relatively rapidly through resistor 78, but discharges slowly through resistor 79. Thus, the voltage across capacitor 82 is the result of the competing charging and discharging.

Op amp 84 buffers the voltage across capacitor 82 and feeds the voltage back to op amp 72. Consequently, if signal peaks greater than the threshold output appear in the input signal, capacitor 82 is charged, in turn raising the threshold output. Alternatively, if the input signal peaks fall below the threshold, capacitor 82 slowly discharges, in turn, slowly lowering the threshold to a minimum value determined by the voltage level of the source connected to terminal 114 of switch 76. The charging and discharging constants as determined by the values of resistors 78 and 79 and capacitor 82 are selected to be both relatively slow when compared to the rise and fall times of the voice signals to be detected so that the threshold circuit has an overall averaging effect and the threshold does not instantly respond to input signal changes.

As will hereinafter be explained, once voice signals are detected, switches 75 and 76 open and isolate capacitor 82. The voltage stored by capacitor 82 is buffered out through op amp 84 to determine the threshold value which remains constant while voice signals are present.

The threshold value is provided to comparator 16, where it is compared with the attenuated output from amplifier 12. Because of amplifier output attenuation, unless there is a significant rise in the audio input to the mixer 12, the comparator output will remain LOW, and the audio input to the amplifier 12 is treated as mere noise. Thus, only speech peaks will be detected.

A significant increase of over, e.g., 6 dB in the amplifier 12 input, such as a momentary spike, as might be indicative of the start of a voice signal, will exceed the threshold level and cause the comparator output to go HIGH. This HIGH signal will occur even in the case of a momentary spike because the threshold circuit is relatively slow to respond due to the aforementioned averaging effect. If the audio signal to the input amplifier represents the sound of a loud hand clap, for example, the PDSH circuit 20 would not be able to adjust threshold before the comparator output responds by going to a positive value.

The output of comparator 16 is illustrated by waveform B of FIG. 2. As can be seen, whenever the audio signal of waveform A is sufficiently loud (i.e., has an amplitude over a selected threshold illustrated by dotted line 200 and actually determined by circuit parameters), the comparator output waveform B generates a HIGH value resulting in pulse train output which corresponds to the peaks in the audio signal. Thus, the two audio bursts result in two separate pulse trains 202 and 204.

When the comparator output goes positive, the positive edge of that signal triggers the first one-shot 56 of the timing circuit 18. The first one-shot 56 detects the end of each signal burst and the output of the first one-shot 56 is illustrated by waveform C of FIG. 2. One-shot 56 has a timeout period which is adjusted in the range of 40 milliseconds (time interval "D1" as shown in FIG. 2). With normal voice signals, a plurality of signal peaks occur within each signal burst and the rising edges of the pulses in the output of comparator 16 continually retrigger one-shot 56 so that its output remains HIGH until the end of the voice signal burst. At the end of each voice signal burst, the output of one-shot 56 will remain HIGH until the one-shot times out and thereafter, the output will become LOW until the start of the next burst of voice signals. Consequently, the output of one-shot 56 will become HIGH at the start of each signal burst and become low after the timeout period following each signal burst.

In addition, normal voice signals characteristically have longer pauses between signal bursts. Absence of those longer pauses (each being over about 40 milliseconds) also indicates that the audio signal from the amplifier 12 is not a voice signal. The ends of longer pauses are detected by the second one-shot 64 whose output waveform is illustrated in line D of FIG. 2. In order to maintain its output HIGH, the second one-shot 64 requires retriggering by a rising edge in the output of the first one-shot 56 within a retrigger period of, e.g., one second, as established by delay adjust 65.

For example, if the output of comparator 16 has continuous transitions without a break for a period of time in excess of the latter retrigger period, e.g., for 1 second (illustrated as time interval "D2" in FIG. 2), the first one-shot output will continue to be HIGH for that length of time and not generate a positive edge. As a result, the second one-shot 64 will not see a positive edge within its retrigger period, and will not be retriggered. Therefore, the output of the second one-shot 64 will go LOW, causing the noise threshold to be reset by enabling switches 75 and 76 by means of the output 66 of one-shot 64.

Alternatively, if the characteristic longer pauses are present in the input signal, the first one-shot 56 will not be retriggered within its retrigger period of about 40 milliseconds, and its output will fall. When the following audio burst arrives, the positive edge, in turn, retriggers one-shot 64 within its retrigger period (for example, at point 206), causing its output to remain HIGH, thereby causing the noise threshold to remain fixed.

Accordingly, if the input signal bursts do not consist of multiple peak signals or the time duration between pauses in the input signal is too short or too long, the VOX output signal becomes LOW and indicates that the input signal was not a voice signal. If, on the other hand, signal peaks pauses in the input signal occur regularly within about 40 milliseconds of one-another, and signal burst occur periodically for longer periods of time, e.g., within one second intervals, as would be characteristic of speech, the VOX output signal indicates that the audio signals received by the amplifier 12 comprise voice signals.

Aircraft Communication System.

Figure 3:
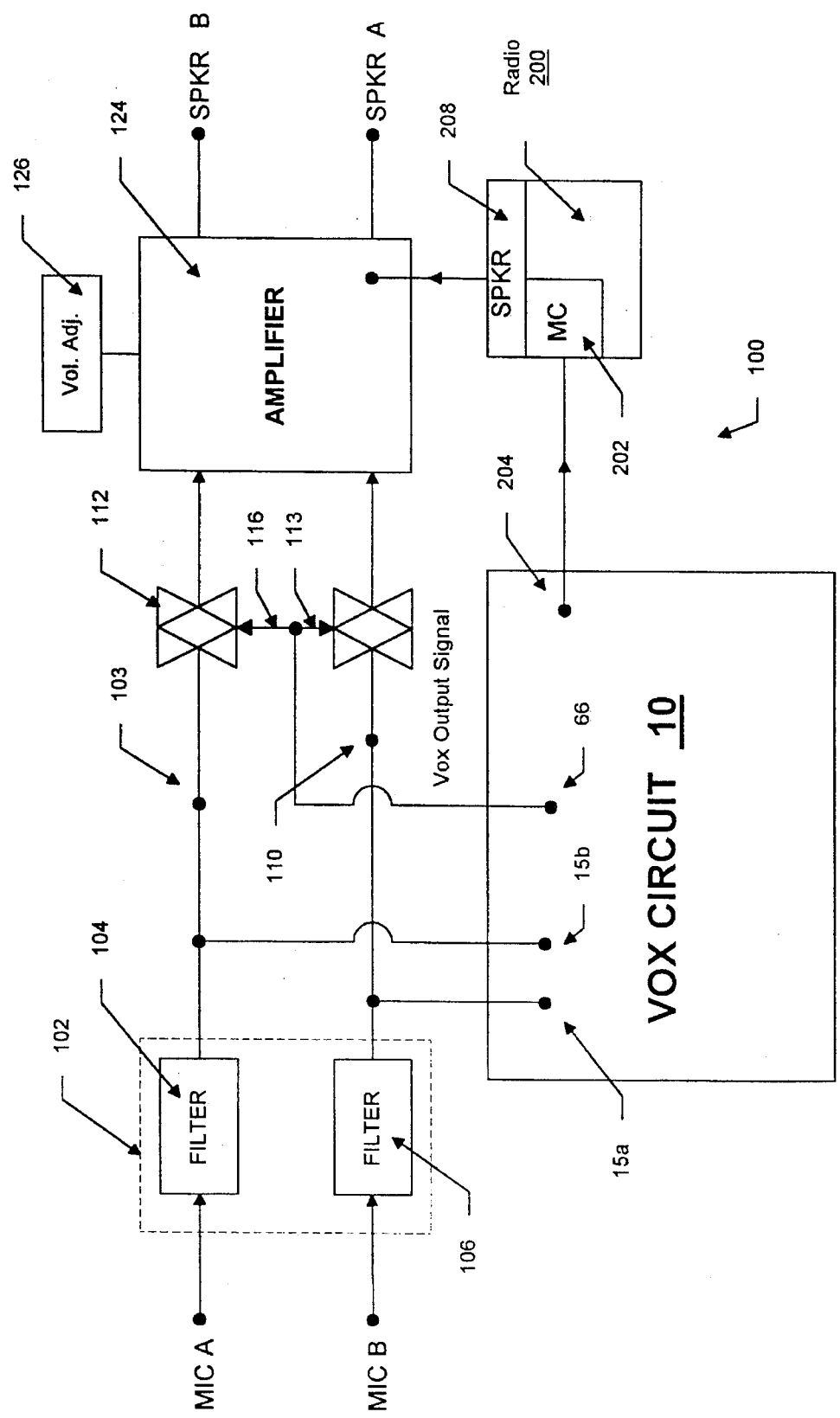
FIG. 3 is a schematic view, partially in block diagram form, of an aircraft communication system employing the VOX circuit of FIG. 1.

FIG. 3 illustrates a practical application of the inventive dynamic VOX circuit in an aircraft communication system 100. The communication system, in accordance with the invention, includes a voice-activated intercom function for intra-plane communication, and a radio function for communication with an airport tower or other radio external to the craft.

The intercom function permits, e.g., two individuals or stations, designated as A and B, to communicate within the craft. Accordingly, the system 100 receives intercom audio signals from a microphone at station A ("MICA") and can selectively deliver those signals to a speaker, e.g., a pair of headphones, at station B ("SPKR B"). Similarly, the system 10 receives intercom audio signals from a microphone at station B ("MIC B") and can selectively deliver them to a speaker, e.g., a pair of headphones, at station A ("SPKR A")

The aircraft communication system 100 includes an input interface 102 with filters 104, 106 for filtering out selected background noise from the audio signals received respectively from MICA and MIC B. The filters 104, 106, for example, can each be high-pass filters or bandpass filters for reducing or eliminating engine noise, which has a maximum fundamental frequency typically of about 250 Hz at full throttle. Any conventional high-pass filter implementation can be used, e.g., a Butterworth filter arrangement. The input interface 102 passes the filtered audio signals to input nodes 15a, 15b of the input amplifier 12 of the VOX circuit 12, as depicted in FIG. 1 and discussed above.

The input interface 102 also passes the filtered audio signals to first input terminals 108, 110 of respective solid-state voice-operated-switches (VOS) 112, 114. The VOS 112, 114 also have control terminals 116, 118, which receive the VOX output signal. The VOS 112, 114 "close," and thereby pass the received audio signals to output terminals 122, 122 connected to an amplifier 124, in response to a HIGH value of the VOX output signals, i.e., when the VOX output signal indicates that the audio signals comprise voice signals. Otherwise, the switches 112, 114 remain "open" so as to disconnect the input microphones (MICA and MIC B) from the output amplifier 124.

The amplifier 124 boosts the audio signals originating from MICA and MIC B (after filtering by filters 104, 106) to a usable level of audio, and delivers the amplified signals to the complementary speakers, SPKR B and SPKR A. The amplifier 124 preferably includes a volume control 126 for controlling the extent of amplification.

As mentioned above, in addition to the intercom function, the communication system 100 has a conventional radio 200, as shown in FIG. 3. The radio 130 has a microphone input 202 that is connected directly to the output of the input amplifier 12 via node 204 of FIG. 1. This direct connection bypasses the VOX circuit 10 and insures that the VOX circuit 10 will not cut off input to the radio in the presence of noise. The radio 200 also has a radio output terminal 208, which is connected directly to the amplifier 124 so that radio output signals can be directly heard in both speakers SPKR A and SPKR B.

What is claimed is:

1. A voice detection circuit for detecting electrical signals representing human speech comprising:

waveform generating apparatus for generating a sequence of waveforms in response to a plurality of electrical signals having a magnitude and a plurality of signal peaks, said electrical signals including sequential bursts of said signal peaks wherein each signal peak has a duration less than a first predetermined time duration and each said burst of signal peaks is separated by a pause;

pause detection apparatus for detecting said pause between a first signal burst and a second signal burst in accordance with said sequence of waveforms; and VOX output signal generating apparatus for generating a VOX output signal when a detected pause has a duration which exceeds said first predetermined time duration and is less than a second predetermined time duration wherein the first predetermined time duration has a duration of approximately 40 milliseconds.

2. A voice detection circuit according to claim 1 wherein the second predetermined time duration has a duration of approximately one second.

3. A voice detection circuit according to claim 1 wherein the waveform generating apparatus comprises:

last signal peak detecting apparatus for detecting a last signal peak in said first signal burst;

first signal peak detecting apparatus for detecting a first signal peak in said second signal burst; and timing apparatus for determining the time duration between a detected last signal peak in said first signal burst and a detected first signal peak in said second signal burst.

4. A voice detection circuit according to claim 1 further comprising:

threshold magnitude establishing apparatus for establishing a threshold magnitude; and apparatus responsive to the electrical signals and to the threshold magnitude for generating an output signal when one of the electrical signals exceeds the threshold magnitude, in order to generate a pattern of control signals.

5. A voice detection circuit for detecting a pattern of electrical signals representing human speech, each electrical signal having a magnitude, the voice detection circuit comprising:

output signal generating apparatus for generating an output signal when one of the electrical signals exceeds a threshold magnitude;

output signal detecting apparatus for detecting a plurality of sequential signal bursts in the output signals;

VOX output signal generating apparatus for generating a VOX output signal when a pause between a first signal burst and a second signal burst indicates that the electrical signals comprise speech signals when the pause has a time duration which exceeds a first predetermined time duration and is less than or equal to a second predetermined time duration; and threshold establishing apparatus for establishing the threshold magnitude further comprising:

a peak detector circuit responsive to the electrical signals for generating a peak signal; and a sample and hold circuit responsive to the VOX output signal for sampling the peak signal when the VOX output signal indicates that the electrical signals are not speech signals and for holding a sampled value when the VOX output signal indicated that the electrical signals are speech signals.

6. A voice detection circuit, for detecting the presence of signals representing speech in audio input signals having a peak value, comprising:

timing logic responsive to a threshold signal and to the audio input signal for generating an output signal when signals representing speech are present in the audio input signal; and threshold generating apparatus for generating the threshold signal in response to the audio input signal and to the timing logic output signal, said threshold generating apparatus comprising a peak detector for detecting the peak value of the audio input signal and a sample and hold circuit coupled to the peak detector and responsive to the timing logic output signal, wherein the threshold signal has a value that samples and tracks the peak value when the timing logic output signal indicates that the voice signals are absent from the audio input signal, and has a value that is held and remains substantially constant when the timing logic output signal indicates that the voice signals are present in the audio input signal.

7. A voice detection circuit according to claim 6 wherein the timing logic comprises a comparator responsive to the audio input signal and to the threshold signal for generating a potential signal representing speech when the audio input signal exceeds the threshold signal.

8. A voice detection circuit according to claim 7 wherein the timing logic comprises a pause-detecting circuit responsive to the potential signal representing speech for generating the timing logic output signal when the potential signal representing speech exhibits predetermined patterns of pauses.

9. A voice detection circuit according to claim 7, wherein the timing logic comprises a pause-detecting circuit coupled to the comparator for generating the timing logic output signal when the potential signal representing speech includes a plurality of first pauses, each exceeding a first duration, and at least one such pause having a duration less than the second duration.

10. A voice detection circuit according to claim 9 wherein the first duration comprises approximately 40 milliseconds.

11. A voice detection circuit according to claim 9 wherein the second duration comprises approximately one second.

12. A voice detection circuit for detecting the presence of voice signals in an audio signal comprising voice signals and background noise signals, the voice detection circuit comprising:

a pause-detecting circuit responsive to a potential voice signal for producing a first output signal when the audio signal comprises voice signals and for producing a second output signal when the audio signal comprises background noise signals;

a capacitor for having a voltage thereacross;

charging apparatus responsive to the second output signal and to the audio signal for charging the capacitor when the audio signal exceeds the voltage across the capacitor;

apparatus for discharging the capacitor;

a switch mechanism responsive to the first output signal for disconnecting the capacitor from the charging apparatus and from the apparatus for discharging the capacitor;

a comparator responsive to the voltage across the capacitor and to the audio signal for generating the potential voice signal when the audio signal exceeds the voltage across the capacitor.

13. A voice detection circuit according to claim 12 wherein the pause-detecting circuit comprises:

a first timer responsive to the potential audio signal for generating a restarting signal when pauses in the potential voice signal exceed a first predetermined time duration; and a second timer for generating the first output signal within a second predetermined time duration, the second timer being responsive to the restarting signal for restarting timing of the second predetermined time duration.

14. A voice detection circuit according to claim 12 wherein the charging apparatus comprises an amplifier for generating an amplified signal and a diode for applying the amplified signal to the capacitor.

15. A voice detection circuit according to claim 12 wherein the comparator is connected to the capacitor by means of an amplifier connected in an emitter-follower configuration.

16. A voice detection circuit according to claim 13 wherein the first predetermined time duration is approximately 40 milliseconds.

17. A voice detection circuit according to claim 13 wherein the second predetermined time duration is approximately one second.

18. A method for detecting a pattern of electrical signals representing human speech comprising the steps of:

receiving a plurality of electrical signals each having a magnitude;

detecting a sequence of signal bursts separated by pauses in the electrical signals wherein each signal burst includes a plurality of signal peaks, each peak having a time duration less than or equal to a first predetermined time duration;

generating a sequence of waveforms corresponding to the sequence of signal peaks and bursts; and generating a VOX output signal indicating that the electrical signals represent human speech when a pause between first and second ones of the waveforms exceeds said first predetermined time duration which is approximately 40 milliseconds and is less than or equal to a second predetermined time duration.

19. The method of claim 18 wherein detecting a sequence of signal bursts includes detecting the plurality of signal peaks in the plurality of electrical signals and generating a corresponding pulse train in response.

20. The method of claim 18 wherein generating a sequence of waveforms includes passing the waveform corresponding to a sequence of signal bursts through a first one-shot responsive according to the first predetermined time duration.

21. The method of claim 18 wherein the VOX output signal is generated when the pause between the first and second waveforms occurs for less than the second predetermined time duration.

22. The method of claim 18 wherein the second predetermined time duration is approximately one second.

* * * * *